March 22, 1960    W. R. CROOKS ET AL    2,929,548
TURBOCOMPRESSOR
Filed June 29, 1956    4 Sheets-Sheet 1

INVENTORS.
William R. Crooks
John Fullemann
BY
Owen & Owen
ATTORNEYS

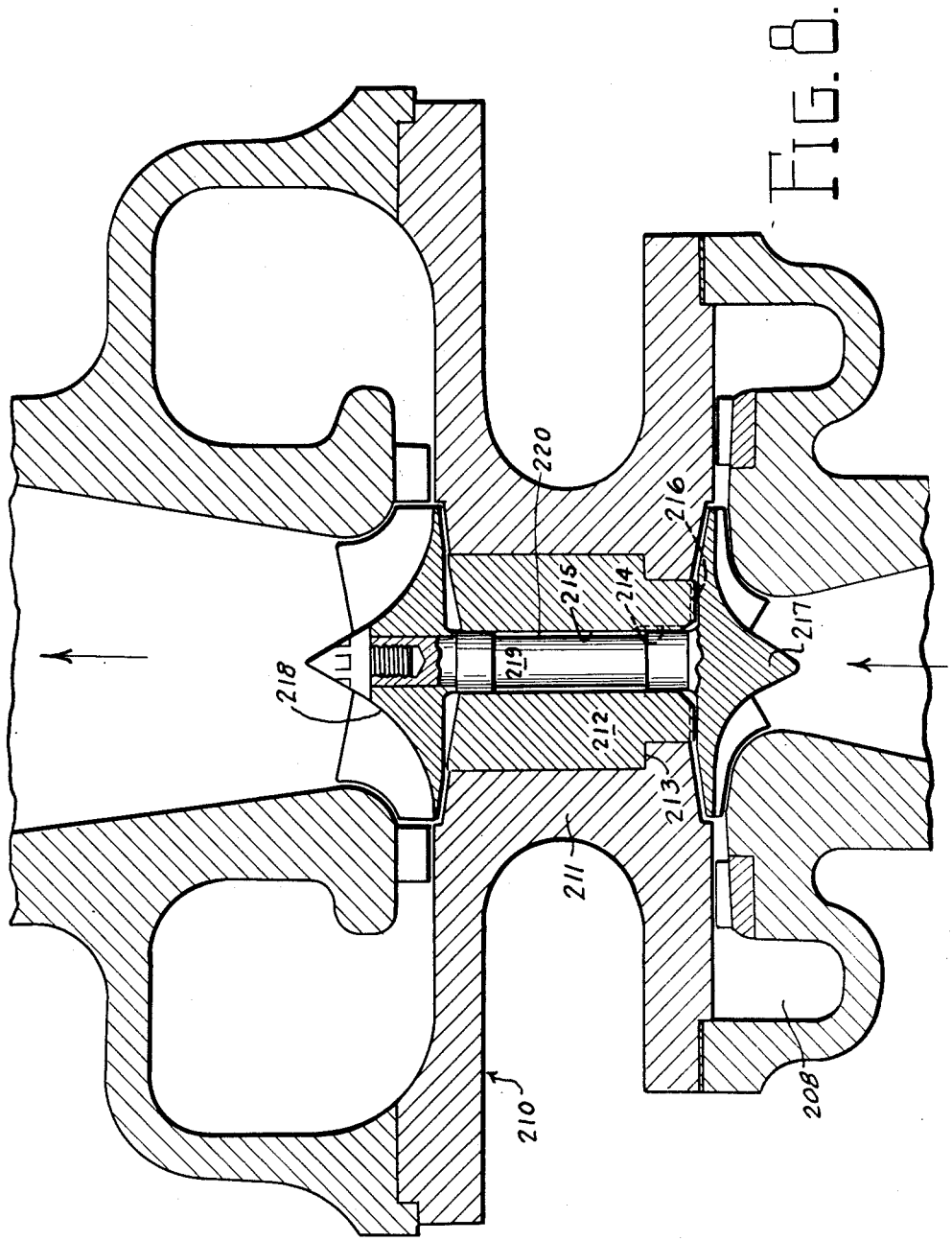

United States Patent Office 2,929,548
Patented Mar. 22, 1960

2,929,548

TURBOCOMPRESSOR

William R. Crooks and John Fullemann, Mount Vernon, Ohio, assignors to The Cooper-Bessemer Corporation, Mount Vernon, Ohio, a corporation of Ohio Application June 29, 1956, Serial No. 594,808

4 Claims. (Cl. 230—116)

This invention relates to small, high speed turbocompressors and to the combination of such compressors in fluid circuits in which the volume of flow is relatively small.

It has heretofore been considered impractical to build centrifugal compressors in a size range to handle gas flows much below 800 c.f.m. because of excessive gas friction in the narrow impeller passages that are required in so small a unit, and also because the speed of rotation is so high that the lubrication of bearings, gears and couplings becomes a major concern. Further, a centrifugal compressor operating at speeds higher than 20,000 r.p.m to 30,000 r.p.m. presents a problem in connecting it to a power source, such as an electric motor or an internal combustion engine because it cannot be directly driven, but must be coupled to the power source by gearing or the like which will impart the necessary high rotative speed to the compressor from the low speed prime mover.

Where small flows of air or gas in the order of 15 c.f.m to 200 c.f.m are desired at pressure ratios of more than 1.5 to 1, compression has always been accomplished by reciprocating machines. The present invention makes it possible to utilize a rotating machine even for these small flows. The present invention is shown and described herein in an embodiment in which small flows at high pressures are produced.

One application of the present invention is in conjunction with compressors used for the catalytic synthesis of ammonia. In such a process, nitrogen and hydrogen are compressed to high pressure, normally from 3000 p.s.i. to 15,000 p.s.i. by means of a multi-stage reciprocating compressor and passed to a catalytic chamber in which a quantity of the gases unite to form ammonia which is taken from the catalytic chamber as a liquid. The free, uncombined gases, which have failed to unite in the chamber are taken from it and recirculated. At the present time the recirculation compressors are large reciprocating machines driven by, for example, a 300 horsepower motor or engine. In the synthesis process the gases should be kept from contact with hydrocarbon lubricants since these materials if entrained in the gas stream act to poison the catalyst. This consideration requires that the piston of the reciprocating compressor be supported at its ends by stuffing boxes and held from bearing contact with the walls of the compressor cylinder which can then be operated without lubrication. It will be appreciated that such a recirculation machine is an expensive unit and one that requires very careful maintenance. By utilizing the compressor of the present invention in place of the above described reciprocating machine, the cost of the installation can be reduced to about 5 percent of the cost of the machines now in use, and the possibility of contaminating the gas stream by lubricants can be completely eliminated.

The present invention is also suited for use in a combination of elements that make possible, for the first time the economical use of rotating equipment for shop air systems. This problem has been troublesome in the past because known rotary compressors necessarily produce too large a volume of compressed air at the desired pressure and if the compressor is designed to operate at low output it becomes physically so small and must operate at such high speed that the problem of driving and journalling the rotor by conventional means has been almost insurmountable. Thus the advantages of first cost and maintenance that are inherent in rotating machines over reciprocating compressors have not been available for small installations where only a few hundred c.f.m. were desired.

The primary object of the present invention is to provide a small, high speed, turbine driven compressor in which the gases being pumped serve to lubricate and suspend the rotor so that the viscous shear forces associated with lubricating liquids which tend to limit rotational speeds are replaced in the present invention by the much lower viscous forces of a gas.

Another object of the invention is to provide a turbine compressor in which a small rotor is provided which operates suspended by a gas stream.

Other objects and advantages of the invention will become apparent from the following specification, reference being had to the accompanying drawings, in which—

Fig. 8 is a central vertical sectional view of a modified turbocompressor suitable for use in the machine shown in Figs. 6 and 7.

Figure 1:
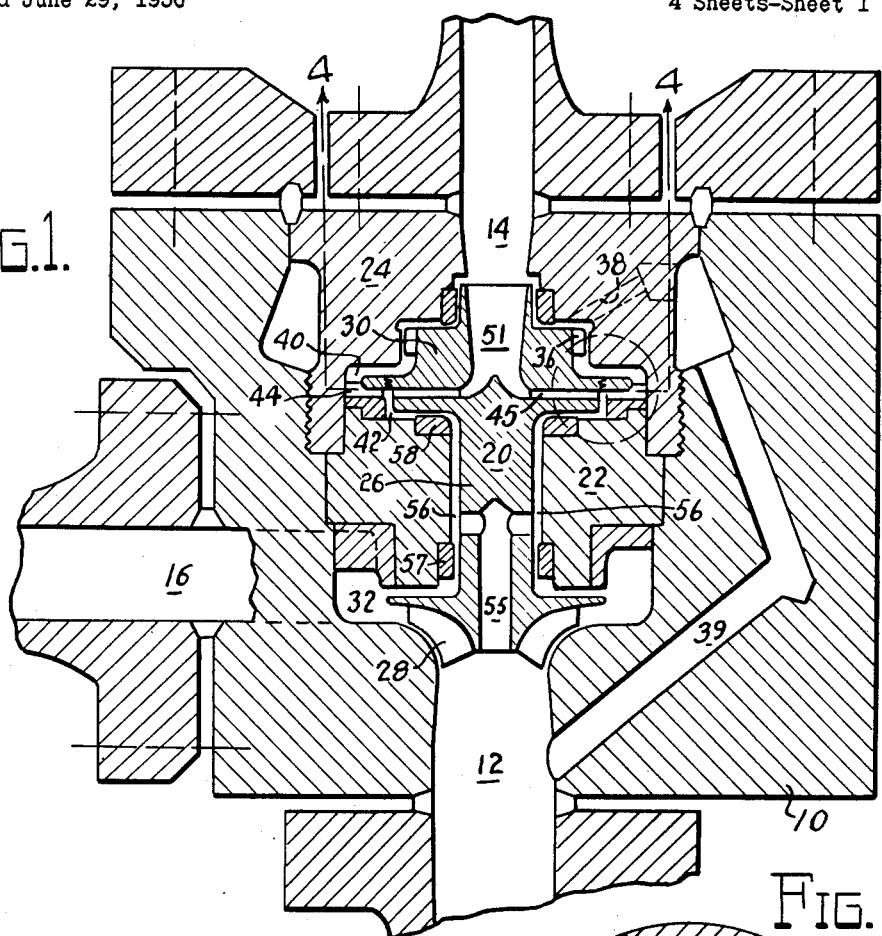
Figure 1 is a central vertical sectional view, somewhat diagrammatic, of a turbocompressor constructed in accordance with the present invention.

In Figure 1 of the drawings there is shown a cross-sectional view of a turbocompressor unit that is applicable either to the problems involved in the ammonia synthesis process above described, or to the compression of air for shop use as also above set forth, or to a process for the liquification of oxygen as hereinafter described. These applications are only three of the more important uses that may be made of a rotative machine operating at high speed with a small volume of gas flow. As shown in the drawing, the turbocompressor comprises a housing or body 10 which may be made quite massive to contain gas at several thousand pounds per square inch pressure. The housing is provided with an inlet passage 12, a turbine discharge passage 14 and a compressor discharge passage 16. The housing 10 is provided with a central cavity into which a rotor 20 and a center assembly 22 are inserted from the top, the assembly 22 being split for insertion along a diameter and being retained by an upper retainer 24.

The rotor 20 comprises a central shaft 26 carrying compressor blading 28 at one end and a turbine rotor 30 at the opposite end. The compressor blading may be of any well-known form used for centrifugal compressors and is chosen for the particular compression ratio, mass flow of gas and other conditions for which it is designed.

The specific form of the centrifugal compressor does not comprise a part of the present invention and while a single stage compressor is shown a multi-stage compressor may be used as well. Gas taken from the inlet passage 12 enters the blading adjacent the hub and is forced radially outward by the blades into a discharge space 32 which connects tangentially with the compressor discharge conduit 16 in a manner well known in the art.

The turbine rotor 30 at the opposite end of the shaft 26 may include a single stage or a multiplicity of stages. In the form shown, the turbine includes a first impulse stage and a second reaction stage, but this may obviously be varied at the selection of the designer. The impulse stage comprises a series of radial blades 36 extending from the periphery of the rotor and receiving gas from a plurality of circumferentially spaced nozzle openings 38 by which the gas is directed tangentially and downwardly with respect to the blades 36. The supply of gas for the turbine is taken from the compressor inlet passage 12 through one or more side passages 39. The turbine inlet pressure thus approximates closely the compressor inlet pressure in the form shown. It will be apparent that the turbine may be supplied from the compressor discharge passage 16 with equal facility if a higher inlet pressure is desired.

The flow of gas in the impulse stage is in a generally axial direction through the blading so that the first turbine stage formed by the blades 36 discharges into an axial flow discharge chamber 40 which is formed by the periphery of the hub and by an opposed stationary wall of the retainer 24. The rotor of the turbine 30, below the first stage is provided with a somewhat enlarged flanged portion immediately below the discharge chamber 40 so that the gas is caused to flow outwardly from the center of the rotor into an inlet passage 42 for the second, reaction turbine stage. The inlet passage 42 is formed in a stationary member that is bolted or otherwise fixed to the center assembly 22 so that it is stationary with respect to the rotor. A labyrinth seal 43 is formed on the periphery of the rotor adjacent the stationary member in which the second stage inlet passage is formed. The inlet passage 42 is further provided with guide vanes 44 which direct the gas first downwardly and then radially inwardly into the second turbine stage containing blades 45.

In order to provide the second turbine stage the rotor 30 is formed in upper and lower sections which are subsequently attached into a unitary structure and which are spaced apart by the series of blades between the upper and lower sections. The upper and lower sections are held together as by rivets 50 which pass through the blades 45 so as to fix the parts in position without introducing the impedance to gas flow of a fastening element. The gas directed from the guide vanes 44 flows into the blading of the second stage, radially inwardly and is discharged into a discharge passage 51 which merges with the axial discharge passage 14.

The entire rotor assembly operates suspended in gas and without frictional engagement with the surrounding stationary wall portions. The present invention provides that the suspending fluid shall have a definite flow pattern, however, and wherever a restriction exists in the flow path a body of material of low dry friction properties is inserted in the stationary housing. This material may be of a graphite, plastic or metallic base, or of any other suitable kind.

Gas for the suspension of the rotor in case of vertical installation is taken originally from the inlet passage 12 into a central passage 55 in the shaft 26 and thence by radial openings into a chamber 56 around the shaft. A lower graphite block 57 separates chamber 56 from the space above the back of the compressor rotor, but the bore of the block has an internal diameter from .003 inch to .005 inch greater than the diameter of the shaft 26. Since the pressure above the back of the compressor rotor will approach the discharge pressure of the compressor, while the pressure in chamber 56 is slightly less than the compressor inlet pressure, the flow of gas around the shaft will always be into the chamber.

The suspension of the rotor and vertical centering thereof is accomplished by the restriction at the underside of the turbine rotor where a second block of heat resistant material 58 is inserted in the center assembly and which separates chamber 56 from the space immediately surrounding the upper portion of the rotor. The gas, at this point, flows radially outward past the stationary block since the pressure in chamber 56 is always higher than the inlet pressure to the second turbine stage. It will be seen that the surface of the graphite block 58 is normally very close to the underside of the turbine rotor, the clearance in practice being only a few thousandths of an inch. For a given set of pressure conditions the spacing between the moving rotor and the stationary block is critical and only one condition of equilibrium will exist. If the rotor should tend to move downwardly and close off the clearance space between the rotor and block the pressure beneath it would rise, tending to restore the rotor to the balanced position. Conversely, if the rotor should tend to move upwardly, the pressure in chamber 56 would tend to drop and cause the rotor to move back into its balanced position. While a vertical orientation of the rotor has been described, it will be apparent that the device will operate in the same manner regardless of the attitude of the shaft. The weight of the rotor is only a few ounces so that bearing loadings would be negligible in comparison to the pressure forces acting on the rotor.

The operation of the turbocompressors so far described can best be understood with reference to a specific set of pressure conditions. In a particular design, the compressor inlet pressure is 2715 p.s.i. and the compressor operation is such that the compressor discharge pressure is 3015 p.s.i. The pressure behind the compressor rotor is slightly less than the discharge pressure and greater than the inlet pressure (which exists in chamber 56) and is approximately 2900 p.s.i but depends somewhat on the clearance between the bore of the lower heat resistant block 57 and the rotor shaft. It will be noted that the compressor rotor, then, has an upward component of force equal to its projected area times some pressure between the inlet and discharge pressures, as well as a downward component equal to the projected area of the rotor less the area of the rotor shaft and times a pressure slightly less than the discharge pressure. It will thus be apparent that the net effect of the axial pressures on the compressor rotor will be in a direction tending to move the rotor upwardly.

The pressures on the turbine rotor may be summed up algebraically in the same manner, by multiplying the effective area of the upper face of the turbine rotor by the pressure of the gas issuing from the nozzle openings which expands down to about 1920 p.s.i. Beneath the turbine rotor, and thus acting upwardly, the pressure is equal to about 1500 p.s.i. which is the inlet pressure of the second turbine stage, and also acting downwardly is the turbine discharge pressure in conduit 16. The net effect of the axial pressures on the turbine rotor will be in a direction tending to move it downwardly, and the magnitude of the pressures is equal and opposite to the upward pressures developed at the compressor end of the rotor. As above noted, the balance of pressures will be preserved by movement of the rotor to increase or decrease the axial extent of the radial passage formed beneath the turbine rotor and above the block 58, there being a pressure drop of about 1200 p.s.i. across the surface of the block 58 with the parts in normal position.

The rotor is thus free to spin on the air bearing thus formed and its speed is not limited by the friction inherent in a lubricant film. In the example in which the pressures above set forth occur, the speed of rotation of the rotor is about 48,500 r.p.m., and the maximum diameter of the rotor is 3.75 inches and the compressor input is about 168 c.f.m. of which 38 c.f.m. is diverted in passage 39 to operate the turbine.

It would not be possible to compress such a small quantity of gas efficiently in known compressors with conventional driving mechanisms. While the art is fully conversant with turbine driven compressors used, for example, as superchargers for internal combustion engines, the flow of gas normally occurring in such units is so high that they have never been considered to be applicable to small flow conditions.

Figure 3:
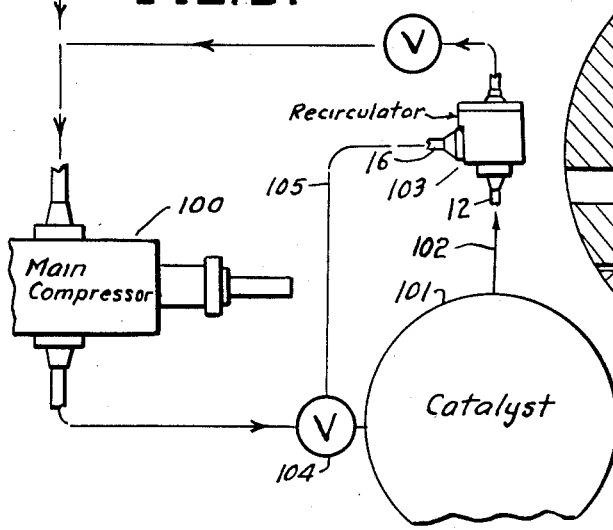
Fig. 3 is a diagrammatic view of a circuit in which the turbocompressor is used in a process for the synthesis of ammonia.
Figure 2:
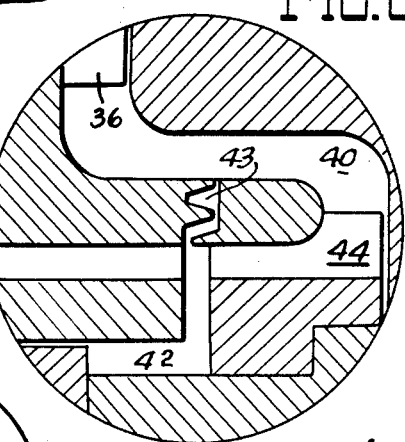
Fig. 2 is an enlargement of the encircled area of the edge of the turbine shown in Fig. 1.
Figure 4:
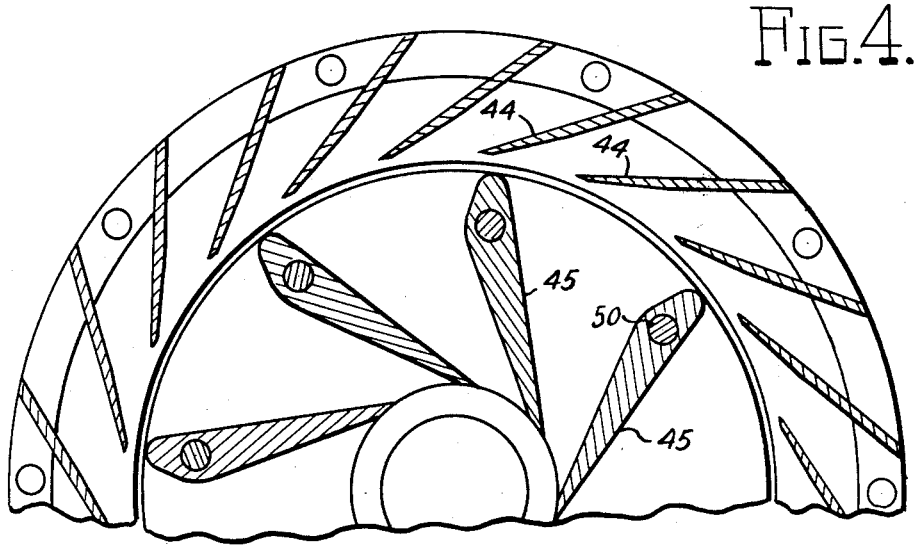
Fig. 4 is a somewhat enlarged sectional view taken on line 4—4 of Fig. 1.

Figure 3 of the drawings illustrates the insertion of a high speed, low flow turbocompressor in the ammonia synthesis process according to the present invention. As there shown a plurality of stages of reciprocating compressors are used to raise the pressure of the reactable gases to the desired pressure which must be at least about 3000 p.s.i. The last stage of the reciprocating compressor is diagrammatically shown and designated 100 in the drawing and is of conventional form. The gas from the last stage is passed through a catalytic tower 101 in which a variable percentage of the reactable gases combine in the presence of the catalyst to form ammonia which is withdrawn through suitable valves (not shown). The uncombined fraction of the gases is taken from the tower in line 102 at about 2700 p.s.i. and recirculated. Conventional recirculation compressors are expensive reciprocating developing about 300 horsepower. The turbocompressor above described is designated 103 in this figure and it will be seen that the compressor intake 12 is connected to the tower 101 while the compressor discharge is connected to a suitable one-way valve 104 to the tower input. The turbine discharge 16 is connected back into the system by a line 105 which conducts the small quantity of gas used in the turbine to an intermediate stage of the reciprocating compressor (not shown) where it re-enters the system. The recirculation is thus accomplished without the addition of a separate prime mover, by deriving energy from the gases that are recirculated, and the spent gases issuing from the turbine exhaust are recovered and recompressed in the system in an intermediate stage.

Figure 6:
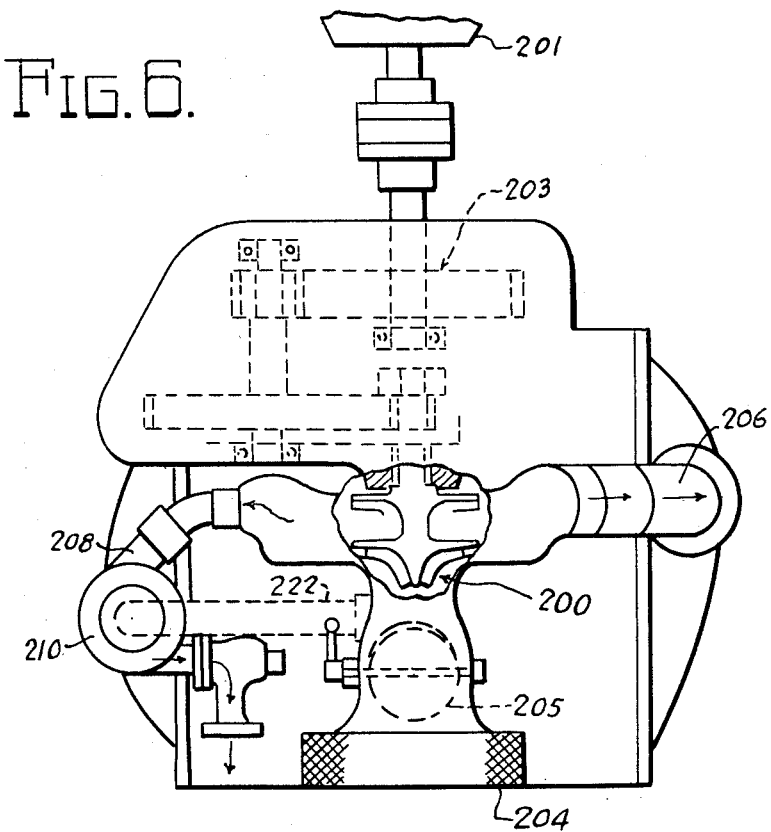
Fig. 6 is a fragmentary, somewhat diagrammatic view, of a compressor for air or other gases constructed in accordance with the present invention in which a turbocompressor is used as a pressure booster.
Figure 7:
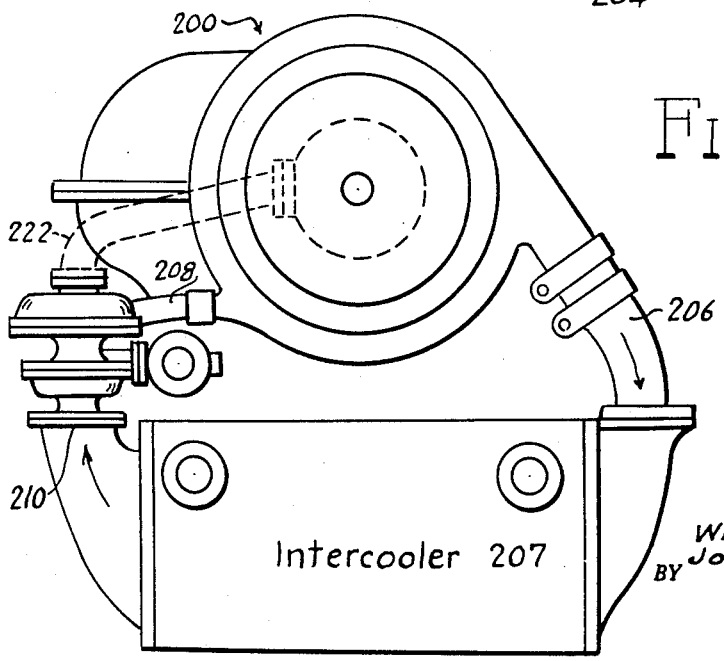
Fig. 7 is a front elevational view of the compressor shown in Fig. 6.

Figures 6 and 7 show the combination of a turbocompressor and a gear driven centrifugal compressor for supplying shop air at a maximum rate of about 500 c.f.m. and under a maximum pressure of 110 p.s.g. In installations of this nature the centrifugal machine has been rarely used for the reason that the demand for ship air nearly always is less than the capacity of the centrifugal compressor, and if it is attempted to make the centrifugal compressor small enough to deliver only the required quantity of air at the required pressure the last of the several stages becomes so small and its required speed of rotation so high that it is impractical. Thus air systems requiring several thousand cubic feet per minute are known, but systems requiring only a few hundred cubic feet per minute have never been operated efficiently. By utilizing a turbo-booster constructed and arranged as herein described a small shop air system may be built advantageously.

In Figs. 6 and 7 a centrifugal compressor 200 having, for example, two stages, is connected to a prime mover 201 by suitable gearing 203. The compressor inlet is designated 204 and this passage contains a restrictor 205 which functions as an unloading valve. The compressor 200 can be driven, for example, at speeds of about 34,000 r.p.m. and compress 920 c.f.m. of atmospheric air to an intermediate pressure of, for example, 43 p.s.i.g. Such a compressor has a second stage blading only about eight inches in diameter and is about at the limit of satisfactory operation. If it is desired to compress in an additional stage or stages to, for example, 110 p.s.i.g., the mass flow of air is so small that an efficient impeller must be driven at speeds that are prohibitively high for a conventional gear drive.

According to the present invention, air from the second stage of compression of the compressor 200 is discharged into a conduit 206, passed through an intercooler 207 and lead to a turbocompressor designated generally 210. A portion of the compressed air from the compressor 200 is diverted to a passage 208 and is used to operate a turbine (130 c.f.m. at 43 p.s.i.g.) and the remainder is compressed to the desired discharge pressure of 110 p.s.i.g. in the centrifugal compressor. The turbocompressor 210 rotates at 136,000 r.p.m. and the maximum diameter of the rotor is about two inches.

A simple form of turbocompressor suitable for the combination above described is shown in Fig. 8. As there shown, a center stator element 211 is provided which is counterbored at its center to receive a balance collar 212 in the form of a thick walled tube of carbon or other low friction material. The outer surface of the tube is stepped as at 213 to seat in the stator at a definite axial location. At one end of the bore of the tube, a series of axial grooves 214 provide communication with a pressure chamber 215 which is formed in the bore by relieving a portion of the rotor shaft as hereinafter described. The grooves 214 are, in effect, continuations of radial grooves 216 formed in an end face of the bushing or collar 212, which grooves communicate with a source of gas under a pressure higher than any pressure existing at the opposite end of the rotor so that the flow of gas is always in the same direction from end to end of the bore of the collar or bushing.

The rotor, in the form shown, comprises a compressor wheel 217 and a turbine wheel 218 connected by a shaft 219. The rotor shaft fits the diameter of the collar or bushing very closely except for a relieved portion 220 which, with the adjacent stationary surface forms the pressure chamber 215.

The operation of the turbocompressor above described is the same as the form shown in Fig. 1 in that the rotor spins on an air bearing and centers itself in the bore of the bushing or collar 212, seeking its own axis of balance. Axially the rotor is held in position by the flow of air from one end to the other and if the rotor tends to move to close off the space between the back of the turbine wheel 218 and the adjacent surface of the collar 212, the restriction to flow of air out of chamber 215 will cause the pressure behind the rotor to increase and the rotor to move outwardly to reopen the proper flow space. The pressure drop across the end of the collar 212 in this instance is the difference between the compressor discharge pressure (110 p.s.i.g.) and the turbine inlet pressure which is about 42 p.s.i.g. In this form also, the effective areas of the inner and outer faces of the two wheels and the pressures existing thereon are equated at the respective ends of the rotor.

If this unit above described is used to compress air the turbine may well exhaust to the atmosphere, but if the unit is used to compress other gas it may be desired to recycle the turbine exhaust. For this purpose a dotted line connection 222 from the turbine exhaust to the inlet passage of the gear driven compressor 200 is shown in Figs. 6 and 7.

Figure 5:
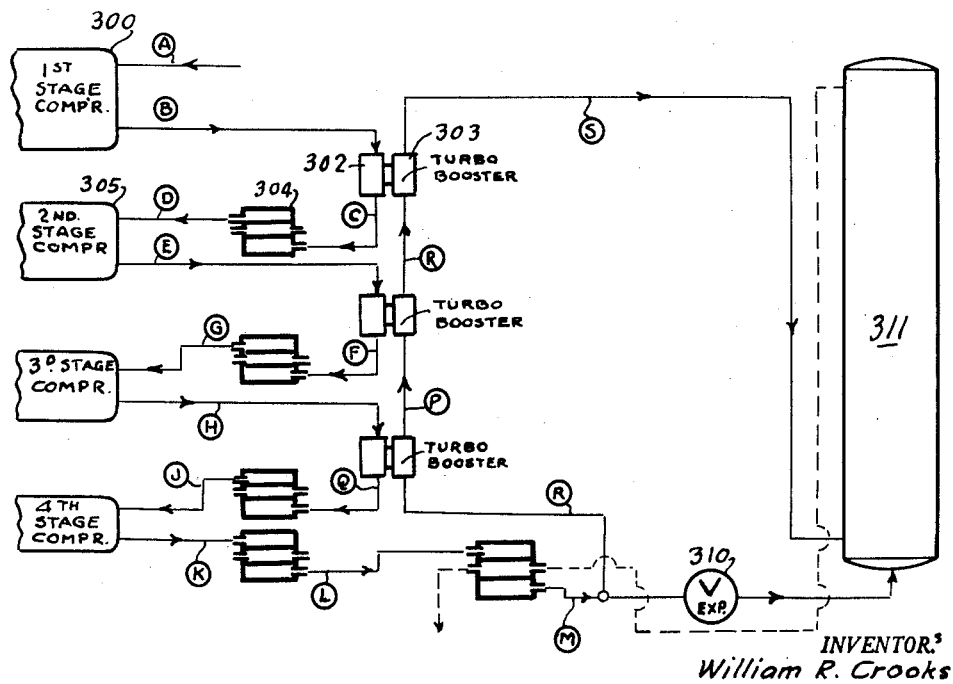
Fig. 5 is a circuit diagram of a process for the manufacture of liquid oxygen in which turbocompressors constructed in accordance with the present invention are used.

Fig. 5 shows schematically a system for the liquification of oxygen in which turbocompressors according to the present invention are advantageously employed. As there shown, gas is taken into a first stage reciprocating compressor 300 and compressed, passing then to a first centrifugal booster 302 driven by a turbine 303. The booster 302 and turbine 303 form a turbocompressor constructed in accordance with the present invention and may be made specifically as shown in Fig. 8, since the energy extracting portion, or turbine, may be single stage. From the booster 302 the gas passes through a heat exchanger 304 to a second reciprocating compressor stage 305. Repeated stages of compression in reciprocating units, coupled with boosting in centrifugal units, followed by cooling in heat exchangers brings the gas at relatively high pressure and medium temperature to a final point where a portion of the gas is split off to expand successively in the turbines of the turbocompressor units while the remainder passes through an expansion valve 310 to a collection tower 311 in which the oxygen is collected at low temperature and low pressure, the temperature being so low that the oxygen exists as a liquid. The temperatures, pressures and flow volumes at the several points in the cycle or "states" are as shown in the following table. On the drawing the "states" are designated by encircled letters, the lead lines running to the pipes or conduits in which the gas in the designated state exists. It will be noted that the flow of gas in cubic feet per minute is very small in certain of the stages; far below that which can be successfully passed through known rotary machines. It will also be noted that the energy extracted from the gas for operation of the turbines not only lowers the temperature of the gas but is returned to the system in the form of energy of compression in the booster units.

*Table I*

| State | Pressure (p.s.i.a.) | Temp. (° R.) | Temp. (° F.) | Flow (lbs.) | Flow, c.f.m. at actual conditions |
|---|---|---|---|---|---|
| A | 14.5 | 555 | 95 | 530 | 7,525 |
| B | 51.1 | 806 | 346 | 530 | 3,115 |
| C | 57 | 840 | 380 | 530 | 2,965 |
| D | 55.5 | 570 | 110 | 530 | 2,080 |
| E | 196 | 815 | 355 | 530 | 885 |
| F | 2,205 | 852 | 392 | 530 | 885 |
| G | 218 | 570 | 110 | 530 | 572 |
| H | 768 | 815 | 355 | 530 | 276 |
| I | 863 | 852 | 392 | 530 | 262 |
| J | 858 | 570 | 110 | 530 | 192.5 |
| K | 3,025 | 815 | 355 | 530 | 58.2 |
| L | 3,010 | 570 | 110 | 530 | 38.8 |
| M | 2,975 | 500 | 40 | 530 | 32.9 |
| N | 2,970 | 500 | 40 | 265 | 16.5 |
| P | 1,275 | 413 | −47 | 265 | 62 |
| R | 425 | 313 | −147 | 265 | 86.7 |
| S | 105 | 227 | −233 | 265 | 206 |

What we claim is:

1. In a turbocompressor, a stator having a compressor end and a turbine end, a rotor in said stator having a central shaft, a pressure chamber formed in said stator around said shaft, a compressor wheel at one end of said shaft, a turbine wheel at the opposite end of said shaft, a source of gas under pressure higher than atmospheric, means to connect said source by passageways in the stator to the inlet of said compressor and to the inlet of said turbine means to connect said source to said pressure chamber, said turbine wheel and said compressor wheel being normally spaced a predetermined distance from the adjacent surfaces of said stator whereby said gas flows from said pressure chamber outwardly adjacent said turbine wheel and inwardly to said chamber adjacent said compressor wheel, the relative effective areas of said compressor and turbine wheels and the pressure of said gas being such that said rotor spins in said stator without frictional engagement therewith.

2. A turbocompressor in accordance with claim 1 in which said turbine wheel comprises a multiplicity of stages and gas from said pressure chamber discharges at the pressure corresponding to the inlet pressure of the last stage.

3. A turbocompressor in accordance with claim 1 in which said compressor is a centrifugal compressor and said turbine wheel comprises a multiplicity of stages and gas from said pressure chamber discharges at the pressure corresponding to the inlet pressure of the last stage.

4. In a turbocompressor, a stator having a compressor end and a turbine end, a rotor in said stator having a central shaft, a pressure chamber formed in said stator around said shaft, a centrifugal compressor wheel at one end of said shaft, a turbine wheel at the opposite end of said shaft, a source of gas under pressure higher than atmospheric, means including passageways in said stator to connect said source to the inlet of said compressor and to the inlet of said turbine, means to connect the discharge of said compressor to said pressure chamber, whereby gas from said pressure chamber flows outwardly from behind said turbine wheel to said turbine inlet, said turbine wheel and said compressor wheel being normally spaced a predetermined distance from the adjacent surfaces of said stator, and the relative effective areas of said compressor and turbine wheels and the pressures of said gas being such that said rotor spins in said stator without frictional engagement therewith.

References Cited in the file of this patent

UNITED STATES PATENTS

| 1,951,819 | Christin | Mar. 20, 1934 |
| 1,957,849 | Pyzel | May 8, 1934 |
| 2,516,066 | McLeod | July 18, 1950 |
| 2,522,787 | Hughes | Sept. 19, 1950 |
| 2,635,804 | Jedrzykowski | Apr. 21, 1953 |
| 2,748,564 | Marchal | June 5, 1956 |
| 2,750,734 | Anxionnaz | June 19, 1956 |
| 2,760,356 | Sixsmith | Aug. 28, 1956 |

FOREIGN PATENTS

| 200,072 | Australia | Jan. 20, 1955 |
| 454,557 | Canada | Feb. 15, 1949 |